UNITED STATES PATENT OFFICE.

GUSTAV THIELE, OF SAND TOWN, TEXAS.

COMPOUND FOR TREATING SEEDS.

SPECIFICATION forming part of Letters Patent No. 608,627, dated August 9, 1898.

Application filed April 18, 1898. Serial No. 678,068. (No specimens.)

*To all whom it may concern:*

Be it known that I, GUSTAV THIELE, a citizen of the United States, residing at Sand Town, in the county of Washington and State of Texas, have discovered a new and useful Composition of Matter to be Used for Killing Weevils in Corn, Beans, or Peas, of which the following is a specification.

My composition consists of the following ingredients, combined in the proportions stated, viz: kerosene-oil, seven tablespoonfuls; oil of turpentine, one tablespoonful; tincture of iodin, one teaspoonful; sulfur, ten grains.

These ingredients are to be thoroughly mixed by shaking the bottle before using.

In using the above-named composition the seed-corn, beans, or peas must be placed in an empty box or barrel and thoroughly mixed with the above-named ingredients three days before planting, stirred occasionally, and covered. Being prepared in this way ready for planting it would not hurt the grain in sprouting when put in the ground if it should stand several weeks. This fluid, as above described, is sufficient to mix in two and one-half bushels of seed-corn, which will be enough to plant fifteen acres. Smaller quantities must be used according to the amount of corn, beans, or peas to be planted.

I am convinced by my own personal experience that by the use of this composition the germ of the weevils which is in the corn, beans, or peas concealed and coming into existence will be destroyed when the corn is in the ground and sprouting without injuring it in its growth and that by the use of this fluid in the manner above mentioned not a single weevil ever will be found in hundreds of bushels of corn, peas, or beans.

I have applied this fluid in said manner for four successive years. I commenced the first time in the year 1894 and found in ten or twelve bushels of corn scarcely an ear with any weevils. In the second year, 1895, I could hardly discover an ear in hundreds of bushels. The third year, 1896, I found none in several hundred bushels, and in 1897 I gathered about three hundred bushels of corn on fifteen acres, but never have found an ear containing weevils in it, having had sound and good corn ever since. I have planted fifteen acres, using two and one-half bushels of seed-corn, mingled with the above described fluid in the manner mentioned.

What I claim, and desire to secure by Letters Patent, is—

The herein-described composition of matter, consisting of kerosene-oil, oil of turpentine, tincture of iodin and sulfur, in the proportions described as and for the purpose specified.

GUSTAV THIELE.

Witnesses:
    WILLIAM F. WALZ,
    HENRY STOERNER.